US007733778B2

(12) United States Patent
Fujita

(10) Patent No.: US 7,733,778 B2
(45) Date of Patent: *Jun. 8, 2010

(54) COMMUNICATION CONNECTION MERGE METHOD AND NODE TO BE USED THEREFOR

(75) Inventor: Norihito Fujita, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 685 days.

This patent is subject to a terminal disclaimer.

(21) Appl. No.: 11/539,705

(22) Filed: Oct. 9, 2006

(65) Prior Publication Data

US 2007/0086453 A1 Apr. 19, 2007

Related U.S. Application Data

(63) Continuation of application No. 09/727,046, filed on Nov. 30, 2000, now Pat. No. 7,136,354.

(30) Foreign Application Priority Data

Nov. 30, 1999 (JP) .............................. 338923/1999

(51) Int. Cl.
H04L 12/26 (2006.01)
H04L 12/28 (2006.01)
(52) U.S. Cl. ........................................ 370/232; 370/401
(58) Field of Classification Search ................ 370/226, 370/252, 395, 401, 409, 469, 230, 232
See application file for complete search history.

(56) References Cited

U.S. PATENT DOCUMENTS 5,274,643 A * 12/1993 Fisk ............................ 370/238

5,467,348 A * 11/1995 Fujii et al. .................... 370/468
5,953,338 A * 9/1999 Ma et al. .................. 370/395.21

(Continued)

FOREIGN PATENT DOCUMENTS

JP 11-103298 4/1999

(Continued)

OTHER PUBLICATIONS

Internet Draft, E.C. Rosen et al., "Multiprotocol Label Switching Architecture", draft-ietf-mpls-arch-06.txt, Aug. 1999, pp. 1-62.

(Continued)

Primary Examiner—Hong Cho
(74) Attorney, Agent, or Firm—Harrity & Harrity, LLP

(57) ABSTRACT

A communication connection merge method and a node to be employed in the same can merge parameter of LSP, such as request bandwidth or the like, upon performing merging. The communication connection merge method performs merge process for consolidating a plurality of communication connection of a connection-oriented network at a node on the way of transfer route into a common communication connection by making judgment of possibility to have a common transfer route from a node to merge to an egress node upon merging new communication connection on setting for existing communication connection, modifying collateral parameter of the existing communication connection which is judged to merge the new communication connection for enabling accommodation of the new communication connection in the existing communication connection, and performing merge after modification of parameter of the existing communication connection.

20 Claims, 9 Drawing Sheets

U.S. PATENT DOCUMENTS

| | | | | |
|---|---|---|---|---|
| 5,991,300 | A | 11/1999 | Tappan | 370/392 |
| 6,069,889 | A * | 5/2000 | Feldman et al. | 370/351 |
| 6,092,113 | A * | 7/2000 | Maeshima et al. | 709/230 |
| 6,148,000 | A * | 11/2000 | Feldman et al. | 370/397 |
| 6,195,355 | B1 | 2/2001 | Demizu | 370/397 |
| 6,205,488 | B1 * | 3/2001 | Casey et al. | 709/238 |
| 6,243,381 | B1 * | 6/2001 | Cai et al. | 370/392 |
| 6,292,466 | B1 * | 9/2001 | Droz | 370/232 |
| 6,295,296 | B1 * | 9/2001 | Tappan | 370/392 |
| 6,336,129 | B1 * | 1/2002 | Ise et al. | 709/201 |
| 6,408,001 | B1 | 6/2002 | Chuah et al. | 370/392 |
| 6,430,155 | B1 * | 8/2002 | Davie et al. | 370/232 |
| 6,449,279 | B1 * | 9/2002 | Belser et al. | 370/397 |
| 6,501,754 | B1 | 12/2002 | Ohba et al. | 370/389 |
| 6,512,744 | B1 * | 1/2003 | Hughes et al. | 370/232 |
| 6,529,958 | B1 | 3/2003 | Oba et al. | 709/237 |
| 6,538,416 | B1 | 3/2003 | Hahne et al. | 370/431 |
| 6,570,878 | B2 | 5/2003 | Cai et al. | 370/392 |
| 6,608,833 | B2 * | 8/2003 | Katsube et al. | 370/392 |
| 6,636,512 | B1 | 10/2003 | Lorrain et al. | 370/392 |
| 6,643,293 | B1 * | 11/2003 | Carr et al. | 370/399 |
| 6,680,943 | B1 | 1/2004 | Gibson et al. | 370/392 |
| 6,690,678 | B1 * | 2/2004 | Basso et al. | 370/468 |
| 6,697,361 | B2 * | 2/2004 | Fredette et al. | 370/389 |
| 6,967,955 | B1 * | 11/2005 | Puntambekar et al. | 370/397 |
| 6,973,057 | B1 * | 12/2005 | Forslow | 370/328 |
| 6,999,419 | B2 * | 2/2006 | Ise et al. | 370/230 |
| 2001/0002192 | A1 * | 5/2001 | Fujita | 370/252 |
| 2002/0176370 | A1 * | 11/2002 | Ohba et al. | 370/252 |
| 2004/0215787 | A1 * | 10/2004 | Gibson et al. | 709/227 |

FOREIGN PATENT DOCUMENTS

JP      11-275092      8/1999

OTHER PUBLICATIONS

Internet Draft, L. Andersson et al., "LDP Specification", draft-ietf-mpls-arch-06.txt, Oct. 1999, pp. 1-124.

Japanese Office Action issued Mar. 16, 2004 (with English translation of relevant portion).

P. Vaananen et al., "Framework for Traffic Management in MPLS Networks", Internet Draft, draft-vaananen-mpls-tm-framework-00.txt, Mar. 1998.

Masaaki Yoneda, "What is the MPLS Technology of the Next Generation Router?", Nikkei Communications, No. 304, Nikkei BP Company, pp. 95-101, Oct. 18, 1999.

Atsushi Abe et al., "A Proposal of Multi-Grade Service on Large Scale IP Networks", Technical Reports of Electronics Information and Communications Society, IN98-200, Mar. 1999.

Sonia Fahmy et al., "Fairness for ABR Multipoint-to-point Connections", Proceedings of SPIE '98 Conference on Performance and Control Network Systems II, vol. 3530, Nov. 1998, 12 pages.

Arun Viswanathan et al, "Evolution of Multiprotocol Label Switching", IEEE Communication Magazine, May 1998, pp. 165-173.

Japanese Office Action issued Oct. 14, 2003 (with English translation of relevant portion).

Hideyuki Tsuboi et al., "A High Speed Computer Communications System Employing Permanent Cut-through Transmission Technology in the ATM Network", Technical Research Report of the Electronic Information and Communications Society, IN97-36, Apr. 22, 1997.

Norihito Fujita et al., "QoS Control Based on MPLS Over ATM", Technical Research Report of Electronic Information and Communications Society, IN 98-197, Mar. 19, 1999.

Naotoshi Watanabe et al., "Viewing Approaches to a Large Scale Internet Backbone", Technical Report of Electronics Information and Communications Society, IN 98-52 Aug. 20, 1998.

Norihito Fujita et al., "Hierarchical Traffic Engineering System for a Large IP Network", Technical Report of Electronics Information and Communications Society, SSE 99-125, Dec. 17, 1999.

Japanese Office Action issued Jun. 17, 2003 (w/English translation of relevant portion).

Proceeds of the 1999 IEICE General Conference, Mar. 25-28, 1999, Keio University, Yokohama, the Institute of Electronics, Information and Communications Engineers.

Widjaja et al., "Performance Issues in VC-Merge Capable Switches for IP Over ATM Networks", 1998; pp. 372-380.

Norihito Fujita, U.S. Appl. No. 09/727,046, "Communication Connection Merge Method and Node to be Used Therefor" filed Nov. 30, 2000, 49 pages.

* cited by examiner

COMMUNICATION CONNECTION MERGE METHOD AND NODE TO BE USED THEREFOR

RELATED APPLICATION

This application is a continuation of U.S. patent application Ser. No. 09/727,046 filed Nov. 30, 2000 which is incorporated herein by reference.

BACKGROUND OF THE INVENTION

1. Field of the Invention

The present invention relates generally to a communication connection merge method and anode to be employed therein. Particularly, the invention relates to a communication connection merge method and node to be employed therein, which merges a plurality of communication connection set in a connection-oriented network during communication with simultaneously updating collateral parameter on a common path performing merging.

2. Description of the Related Art

Conventionally, a communication connection merge method and a node to be employed in the same is used for merging communication connections which make transfer path from a merge point to an egress label switching router (LSR) common, upon setting a label switching path (LSP) in a MultiProtocol Label Switching (MPLS) network as disclosed in Internet Draft, draft-ietf-mpls-arch-06.txt, August, 1999 and Internet Draft, draft-ietf-mpls-ldp-06.txt, October, 1999, for example.

Here, merge means consolidating a plurality of transfer paths into a single transfer path at a mid-way. In a path from a merge point to an egress LSR, the same transfer path identifier (here, a label of MPLS) is used for the packet. By performing merging, number of transfer label of LSR can be reduced to contribute for operation of a large-scale network.

Next, the prior art will be discussed with assumption that connection-oriented network being MPLS network, communication connection being LSP and node being LSR. Referring to FIG. 9, the MPLS network 1 is constructed with LSRs 101 to 104. Respective LSR 101 to 104 are connected through links 201 to 203. Data is exchanged through these links 201 to 203. On the other hand, an LSP 301 routed from the LSR 101 to the LSR 103 via the LSR 102 is present.

Here, consideration is given for the case that new LSP is established from the LSR 104 to the LSR 103, at first, the LSR 104 feeds an LSP setup request 401 for the LSR 103 to the LSR 102 using an LSP setting protocol. The LSR 102 receiving the LSP setup request 401 makes judgment whether or not LSP to be merged to the LSR 103 is present. If present, merging is performed. Here, since the LSP 301 which makes the path to an egress router in common, is already present, merging can be performed.

Upon performing merging, setting of LSP is not requested beyond the LSR 102 (namely to the LSR 103), an LSP setup response 402 is returned to the LSR 104. Then, with taking the LSR 104 as starting point, an LSP 302 to be merged to the LSP 301 is set in the LSR 102.

In the conventional communication connection merge method, collateral parameter (called parameter), such as request bandwidth or the like owned by the LSP cannot be merged upon performing merging. This is because the merging is performed without modifying the parameter of existing LSP.

As an example of such parameter, there are parameter relating to traffic, such as request bandwidth, delay or the like, parameter relating to policy, such as Virtual Private Network (VPN) identifier, preference or the like.

On the other hand, in the conventional communication connection merge method, once merging is performed, the merged LSP cannot be branched at the mid-way. Therefore, even if the parameter, such as request bandwidth or the like owned by the LSP could be merged together, the range of application is limited to the case where transfer path to the egress LSR can be common. For example, even if the most portion of the transfer path is common, merging cannot be performed if the egress LSR is different.

SUMMARY OF THE INVENTION

Therefore, the present invention has been worked out for solving the problem. It is an object of the present invention to provide a communication connection merge method and a node to be employed in the same, which can merge parameter of LSP, such as request bandwidth or the like, upon performing merging.

Another object of the present invention to provide a communication connection merge method and a node to be employed in the same, which can merge the parameter of the LSP together and can branch the LSP once merged.

According to the first aspect of the present invention, a communication connection merge method performing merge process for consolidating a plurality of communication connection of a connection-oriented network at a node on the way of transfer route into a common communication connection, comprises:

a step of making judgment of possibility to have a common transfer route from a node to merge to an egress node upon merging new communication connection on setting for existing communication connection;

a step of modifying collateral parameter of the existing communication connection which is judged to merge the new communication connection for enabling accommodation of the new communication connection in the existing communication connection; and a step of performing merge after modification of parameter of the existing communication connection.

According to the second aspect of the present invention, a communication connection merge method performing merge process for consolidating a plurality of communication connection of a connection-oriented network at a node on the way of transfer route into a common communication connection, comprises:

a step of making judgment whether a tunneling communication connection is present in a section where the existing communication connection and the new communication connection have a common transfer route upon merging new communication connection on setting for exsiting communication connection;

a step of modifying collateral parameter of the tunneling communication connection to merge the new communication connection for enabling accommodation of the new communication connection in the tunneling communication connection; and a step of performing merge the existing communication connection and the new communication connection on the tunneling communication connection in a condition to be branched at a terminal point node after modification of parameter of the existing communication connection.

According to the third aspect of the present invention, a communication connection merge method performing merge process for consolidating a plurality of communication connection of a connection-oriented network at a node on the way of transfer route into a common communication connection, comprising:

a step of newly setting a tunneling communication connection capable of accommodating collateral parameter of the existing communication connection and the new communication connection in a section where the existing communication connection and the new communication connection have a common transfer route upon merging new communication connection on setting for existing communication connection; and a step of performing merge the existing communication connection and the new communication connection on the tunneling communication connection in a condition to be branched at a terminal point node after modification of parameter of the existing communication connection.

According to the fourth aspect of the present invention, a node performing merge process for consolidating a plurality of communication connection of a connection-oriented network at a node on the way of transfer route into a common communication connection, comprises:

means for making judgment of possibility to have a common transfer route from a node to merge to an egress node upon merging new communication connection on setting for existing communication connection;

means for modifying collateral parameter of the existing communication connection which is judged to merge the new communication connection for enabling accommodation of the new communication connection in the existing communication connection; and means for performing merge after modification of parameter of the existing communication connection.

According to the fifth aspect of the present invention, a node performing merge process for consolidating a plurality of communication connection of a connection-oriented network at a node on the way of transfer route into a common communication connection, comprises:

means for making judgment whether a tunneling communication connection is present in a section where the existing communication connection and the new communication have a common transfer route upon merging new communication connection on setting for existing communication connection;

means for modifying collateral parameter of the tunneling communication connection to merge the new communication connection for enabling accommodation of the new communication connection in the tunneling communication connection; and means for performing merge the existing communication connection and the new communication connection on the tunneling communication connection in a condition to be branched at a terminal point node after modification of parameter of the existing communication connection.

According to the sixth aspect of the present invention, a node performing merge process for consolidating a plurality of communication connection of a connection-oriented network at a node on the way of transfer route into a common communication connection, comprises:

means for newly setting a tunneling communication connection capable of accommodating collateral parameter of the existing communication connection and the new communication connection in a section where the existing communication connection and the new communication connection have a common transfer route upon merging new communication connection on setting for existing communication connection; and means for performing merge the existing communication connection and the new communication connection on the tunneling communication connection in a condition to be branched at a terminal point node after modification of parameter of the existing communication connection.

Namely, in the communication connection merge method according to the present invention, the label switching router upon receipt of the label switched path setup request makes judgment whether or not the newly set label switched path can be merged to the existing label switched path. As a criterion for judgment, in addition to have a common route to the egress label switching router, it is checked whether the parameter of the existing label switched path can be modified so that the parameter of the new label switched path having parameter, such as requested bandwidth or the like may be accommodated in the existing label switched path.

For modifying parameter of the existing label switched path, negotiation has to be performed for all of label switching routers on downstream side of the label switching router to merge whether or not parameter can be modified. This can be realized by signaling or the like. As a result of negotiation, if modification of parameter is possible, merge is performed.

On the other hand, if modification of the parameter is not possible, merge is not performed to send the label switched path setup request to the downstream side label switching router for setting another label switched path. By employing such method, parameter, such as requested bandwidth or the like can be merged together with the label switched path, upon merging.

Also, in the communication connection merge method according to the present invention, when the tunneling label switched path is preliminarily set in the multi-protocol label switching network, as a part of the route of the label switched path to be newly established, if tunneling label switched path can be used, negotiation is performed for modifying parameter of the tunneling label switched path so that the newly established label switched path may be accommodated in the tunneling label switched path in the process similar to those set forth above. As a result of negotiation, if modification of parameter is possible, the label switched path may be set with using the tunneling label switched path as a part of the route of the label switched path.

In the portion where the tunneling label switched path is used as a part of transfer route of the label switched path, label stack of the multi-protocol label switching is employed for the transfer packet to add the label of the tunneling label switched path in front of the label of the label switched path. In the tunneling label switched path, a plurality of the label switched path can be accommodated. In the portion other than the tunneling label switched path, the routes of the accommodated label switched paths are not necessarily the same.

By employing such method, it becomes possible to merge the parameter of label switched path together with the label switched path, and in conjunction therewith, the label switched path once merged can be branched on the way.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
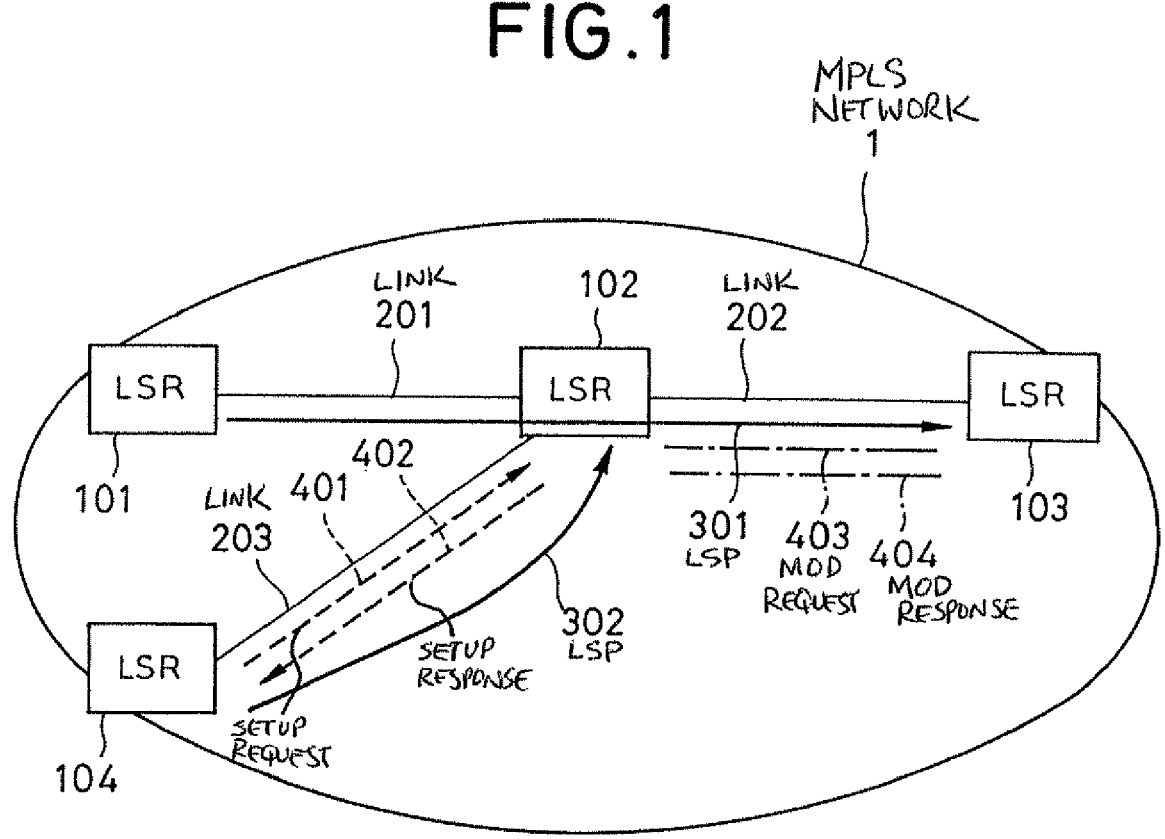
FIG. 1 is an illustration for explaining the first embodiment of a communication connection merge system according to the present invention.

FIG. 1 is an illustration for explaining the first embodiment of a communication connection merge system according to the present invention. In FIG. 1, the first embodiment of the present invention is premised for application to a MPLS network 1 as a representative of a connection-oriented network.

The MPLS network 1 is consisted of LSRs 101 to 104. Respective LSRs 101 to 104 are connected to links 201 to 203. On the other hand, an LSP 301 is set from the LSR 101 to the LSR 103 via the LSR 102.

Figure 2:
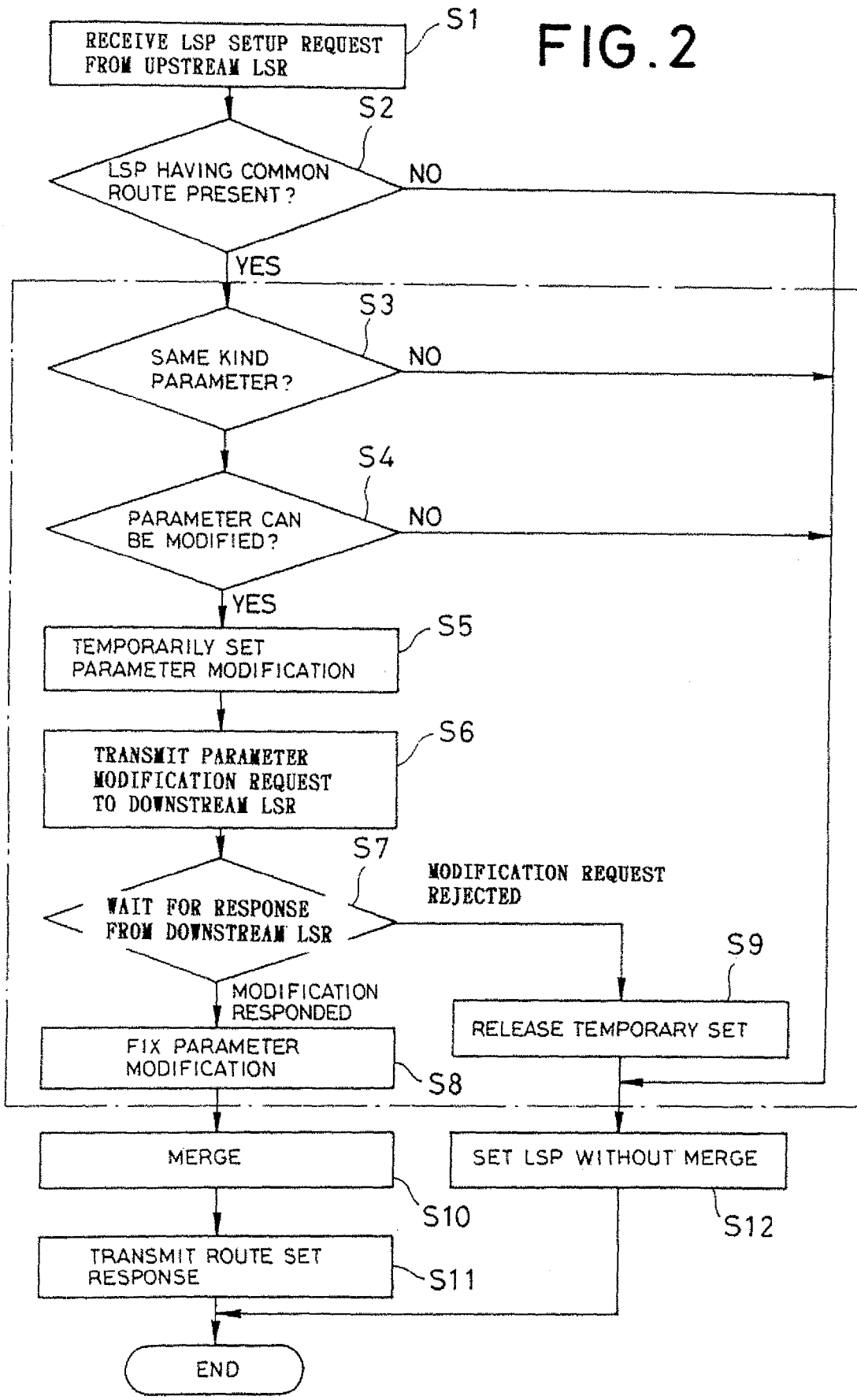
FIG. 2 is a flowchart showing an operation in an LSR 102 in the first embodiment of the communication connection merge system according to the present invention.
Figure 3:
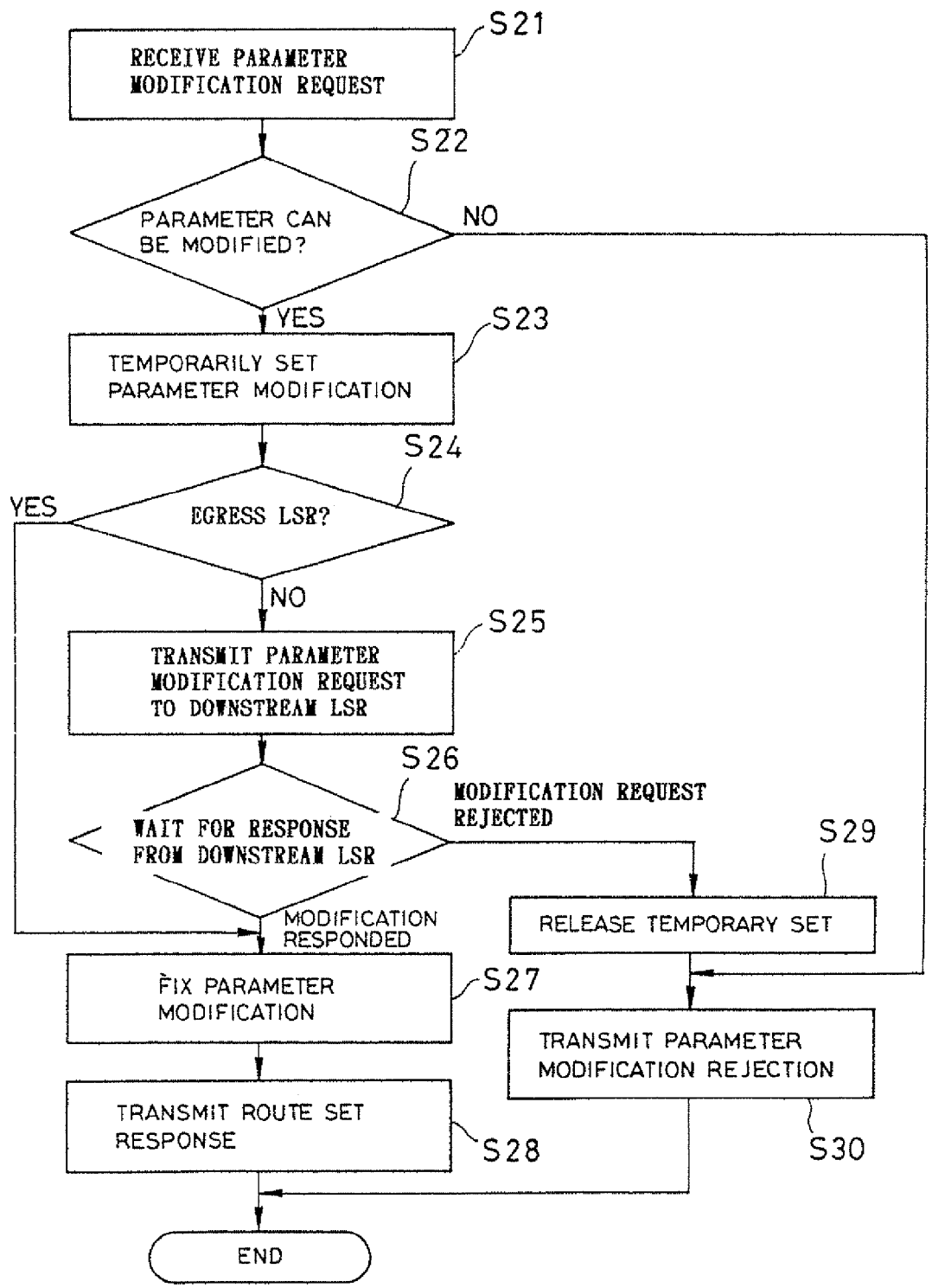
FIG. 3 is a flowchart showing an operation in an LSR 103 in the first embodiment of the communication connection merge system according to the present invention.

FIG. 2 is a flowchart showing an operation in an LSR 102 in the first embodiment of the communication connection merge system according to the present invention, and FIG. 3 is a flowchart showing an operation in an LSR 103 in the first embodiment of the communication connection merge system according to the present invention. The operation of the first embodiment of the present invention will be discussed with reference to FIGS. 1 to 3.

At first, consideration will be given for the case where a new LSP is established from the LSR 104 to the LSR 103 via the LSR 102. Here, the LSP to be newly set has parameters, such as request bandwidth or the like. The LSR 102 receives an LSP setup request 401 transmitted from the LSR 104 (step S1 of FIG. 2).

The LSR 162 receiving the LSP setup request 401 checks whether the LSP having a common route to the egress LSR 103 from the LSR 102 (step S2 of FIG. 2). When such LSP is present, merging is not performed and the process is transit to a procedure for setting the LSP (step S12 of FIG. 2).

As a result of judgment at step S2, if LSP, in which a route from the LSR 102 to the LSR 103 is common is present, a check is performed whether the existing LSP has the same kind of parameter as that of the LSP to be newly established (step S3 of FIG. 2). If the existing route does not have the same kind of parameter as that of the LSP to be newly established merge cannot be performed. Therefore, the process is advanced to the LSP establishing procedure without performing merge (step S12 of FIG. 2).

As a result of judgment at step S3, it is assumed that the LSP 301 having the same kind of parameter as the LSP to be newly set, is present. In this case, a check is performed in the LSR 102 whether or not the parameter of the LSP 301 can be modified (step S4 of FIG. 2). If modification of the parameter is not possible, the process is advanced to the LSP establishing procedure without performing merge (step S12 of FIG. 2).

As a result of checking at step S4, if modification of the parameter is possible, the modification is set temporarily (step S5 of FIG. 2). Here, temporarily set means obtaining of a resource for modification of the parameter without actually modifying the parameter of the LSP. Furthermore, a parameter modification request 403 of the LSP 301 is transmitted along the transfer route of the LSP 301. Then, a response to the request is waited. (steps S6 and S7 of FIG. 2).

The LSR 103 upon receipt of the parameter modification request 403 of the LSP 301, checks whether or not modification of the parameter of the LSP 301 as requested is possible (steps S21 and S22 of FIG. 3). If modification is not possible, rejection of modification of the parameter is noticed to the LSR which transmitted the request (upstream LSR: in this case LSR 102) (step S30 of FIG. 3).

As a result of checking at step S22, if modification is possible, modification of the parameter is temporary (step S23 of FIG. 3). Here, if the own node is the egress LSR, the modification of the parameter is fixed as is (steps S24 and S27 of FIG. 3). In case of the LSR 103, since it is the egress LSR, this procedure is applied.

If the LSR is not the egress LSR, the parameter modification request is transmitted to the downstream LSR on the LSP to wait for the response (steps S24 to S26 of FIG. 3). When the rejection of modification of parameter is noticed from downstream LSR, rejection of modification of parameter is transmitted to the upstream LSR (step S29, S30 of FIG. 3).

On the other hand, if the parameter modification response is received from the downstream LSR, the modification of the parameter is fixed (step S27 of FIG. 3). After fixing the modification of parameter, the parameter modification response 404 is transmitted to the upstream LSR (step S28 of FIG. 3).

When the LSR 102 receives the rejection of parameter modification from the downstream LSR, temporary setting of the parameter modification is released to transit to the LSP setting procedure without performing merge (steps S9 and S12 of FIG. 2).

When the LSR 102 receives the parameter modification response from the downstream LSR, the parameter modification is fixed to perform merge of the LSP (step S8 and S10 of FIG. 2). Then, an LSP setting response 402 is transmitted to the LSR 104 (step 511 of FIG. 2). As a result, setting of the LSP 302 to be merged to the LSP 301 by the LSR 102 with taking the LSR 104 as merge point, is completed.

The shown embodiment is characterized by modification of the parameter of the existing LSP so that the parameter of the LSP to be newly established may be accommodated in the existing LSP from the merge point to the egress LSR in addition to the case where the route is taken as common in the path from the merge point to the egress LSR, upon merging the LSP to be newly established into the existing LSP. By this, it becomes possible to merge the LSP with collateral parameter, such as requested bandwidth or the like, for example.

On the other hand, in the shown embodiment, merge is taken place after modification of the parameter of the existing LSP in the section from the merge point to the egress LSR. However, when the LSP once merged is to be released, releasing may be taken place after modification of the parameter so that the LSP remained may be accommodated, is negotiated (step S13 in FIG. 2).

Furthermore, the present invention may be implemented in other ways with taking Asynchronous Transfer Mode (ATM) network as a replacement of the MPLS network, a Virtual Channel (VC) as a replacement of the LSP, and an ATM switch as a replacement of the LSR.

Figure 4:
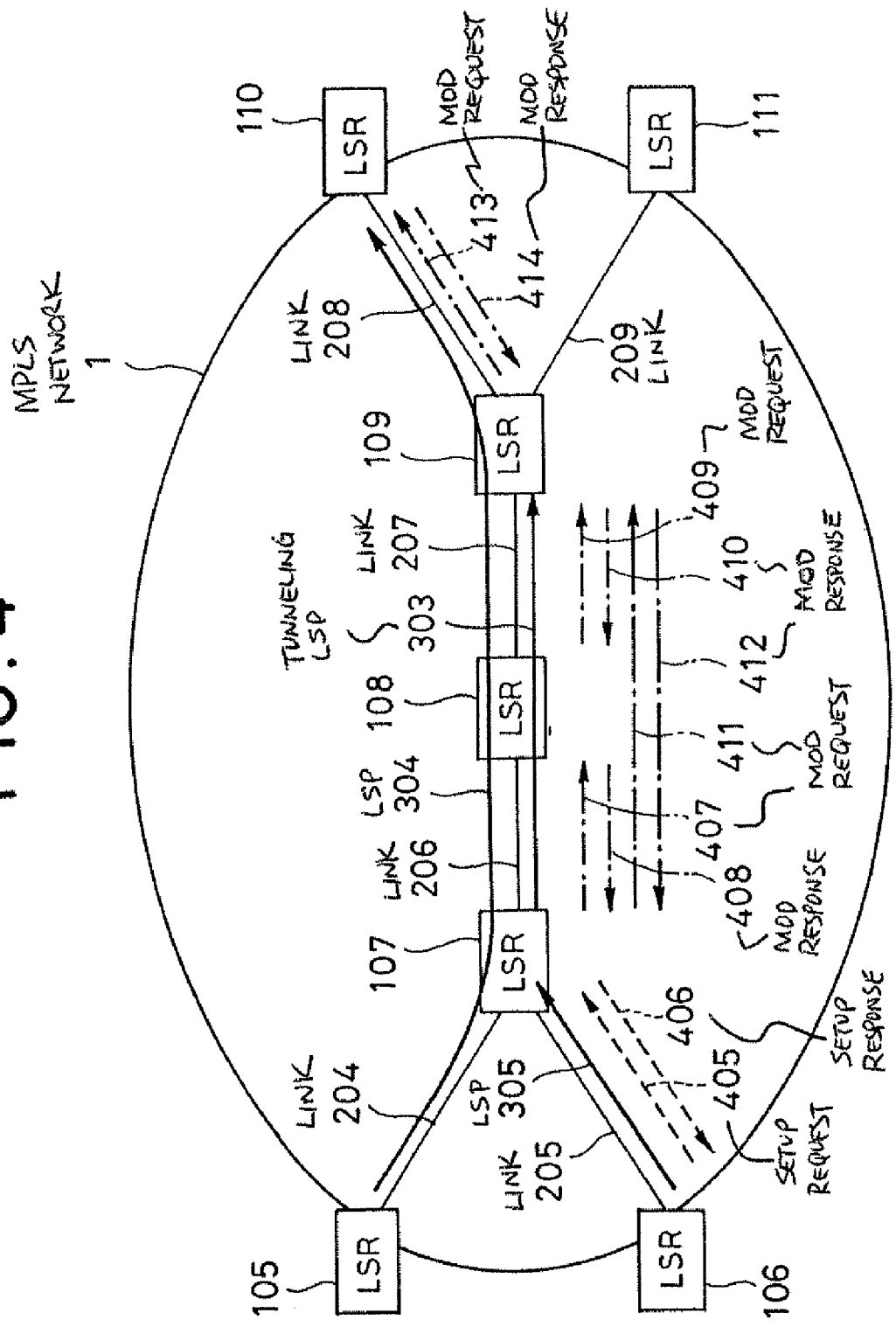
FIG. 4 is an illustration for explaining the second embodiment of a communication connection merge system according to the present invention.
Figure 5:
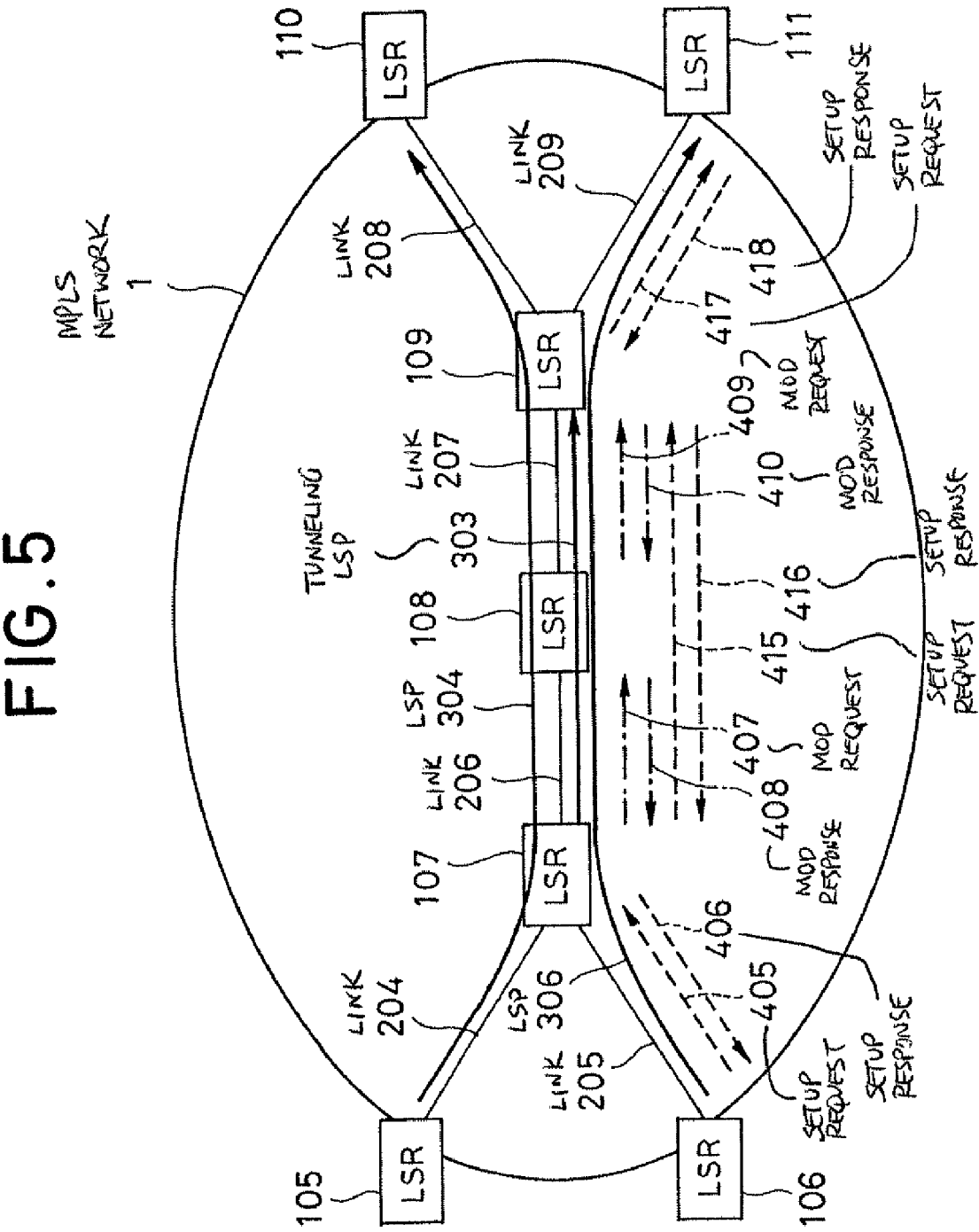
FIG. 5 is an illustration for explaining the second embodiment of a communication connection merge system according to the present invention.

FIGS. 4 and 5 are illustration for explaining the second embodiment of the present invention. The second embodiment of the present invention will be discussed with reference to FIGS. 4 and 5. Here, the second embodiment of the present invention is premised to perform merge under the condition where the MPLS network is employed for performing merging as a representative of the connected oriented network.

The MPLS network is constructed with the LSRs 105 to 111. Respective LSRs are connected by links 204 to 209. On the other hand, a tunneling link LSP 303 from the LSR 107 as starting point to the LSR 109 via the LSR 108. Furthermore, LSP 304 from the LSR 105 as starting point to the LSR 110 via the LSRs 107 and 109 are also set preliminarily.

Among the transfer route of the LSP 304, the tunneling LSP 303 is used between the LSR 107 and the LSR 109. This portion is realized using an MPLS label stack. Between the LSR 107 and the LSR 109, a label assigned for the tunneling LSP 303 is stacked in front of the label assigned for the LSP 304.

Figure 6:
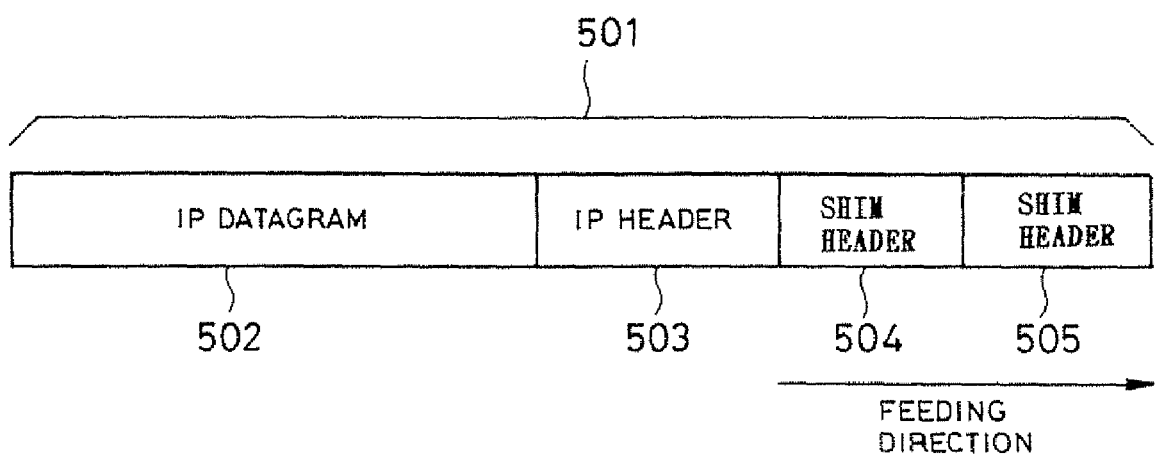
FIG. 6 is an illustration for explaining a structure of a MPLS packet.

FIG. 6 is an illustration for explaining a construction of the MPLS packet. In FIG. 6, there is shown the structure of an MPLS packet flowing on the LSP 304 between the LSR 107 and the LSR 109.

An MPLS packet 501 has shim headers 504 and 505, which precede an IP header 503. Each shim header includes an MPLS label. A label in the shim header 504 is assigned for the LSP 304, and one in the shim header 505 for the tunneling LSP 303.

Note that the shim header 505 is applied only between the LSR 107 and the LSR 109 to be used as the transfer route in which the tunneling LSP 303 is used as the transfer assignment. In the other sections, the shim header 504 appears at the top stack entry.

Figure 7:
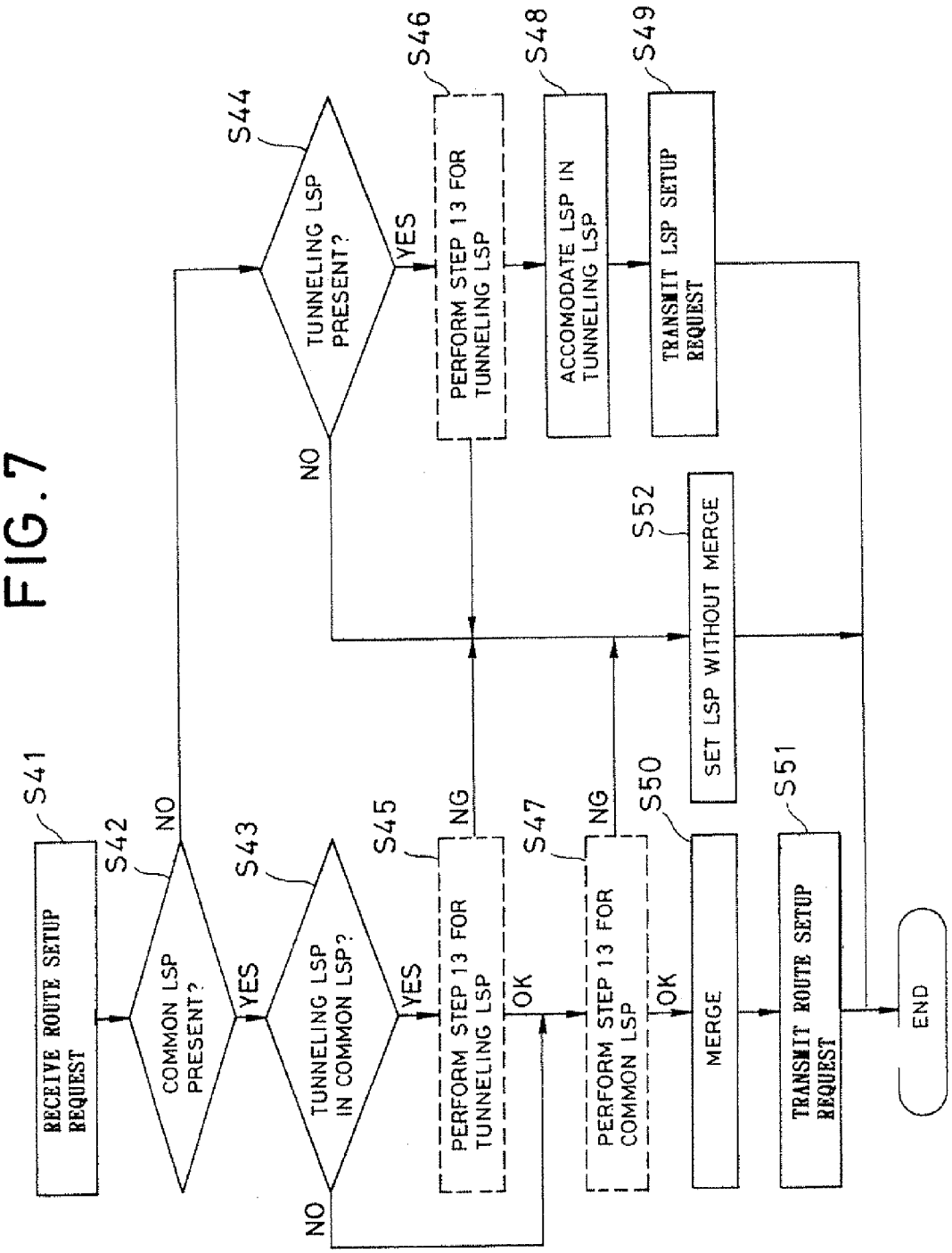
FIG. 7 is a flowchart showing an operation in an LSR 107 in the second embodiment of the communication connection merge system according to the present invention.

FIG. 7 is a flowchart showing an operation of the LSR 107 in the second embodiment of the present invention. The operation of the second embodiment of the present invention will be discussed with reference to FIGS. 4, 5 and 7.

Let us consider the case that the LSP from the LSR 106 to the LSR 110 via the LSR 107 is initiated. Here, the initiated LSP includes collateral parameters, such as requested bandwidth or the like.

The LSR 106 transmits the LSP setup request 405 to the LSR 107. The LSR 107 upon receipt of the LSP setup request 405 checks whether the LSP having the common route to the egress LSR in the similar manner as that in the first embodiment of the invention (step S41 and S42 in FIG. 7). If such LSP is present, attempt is made to merge the newly established LSP to the existing LSP having the common route to the egress LSR. In FIG. 4, the LSP 304 is the LSP to be merged.

At first, the LSP 304 checks whether the LSR 107 uses the tunneling LSP as a part of the transfer route (step S43 in FIG. 7). As a result of checking at step S43, if the LSP 304 uses the tunneling LSP as apart of the transfer route at the LSR 107, modification of the parameter of the tunneling LSP is negotiated in the similar manner as step S13 of FIG. 2 so that the newly established LSP may be accommodated (step S45 in FIG. 7). In FIG. 4, since the LSP 304 uses the tunneling LSP 303 as a part of the transfer route at the LSR 107, the process is moved from step S43 to S45.

Step S13 in FIG. 2 is the portion surrounded by the broken line, which becomes OK when modification of the parameter is successful, and becomes NG when modification of the parameter is failed in certain reason. If OK, the process transits to step S10 in the case of FIG. 2 and to step S12 otherwise.

At step S45, when modification of parameter is successful, exchange of message relating to modification of parameter is performed in sequentially order of transmitting the parameter modification request 407 from the LSR 107 to the LSR 108, transmitting the parameter modification request 409 from the LSR 108 to the LSR 109, transmitting the parameter modification response 410 from the LSR 109 to the LSR 108, and transmitting the parameter modification response 408 from the LSR 108 to the LSR 107.

As a result of process at step S45, if the modification of parameter is not successful, the procedure to establish the LSP is executed in place of executing merge (step S52 in FIG. 7). If the modification of parameter is successful, the parameter of LSP 304 itself is modified (step S47 in FIG. 7).

At step S47, when modification of parameter is successful, exchange of message relating to modification of parameter is performed in sequentially order of transmitting the parameter modification request 411 from the LSR 107 to the LSR 109, transmitting the parameter modification request 413 from the LSR 109 to the LSR 110, transmitting the parameter modification response 414 from the LSR 110 to the LSR 109, and transmitting the parameter modification response 412 from the LSR 109 to the LSR 107.

As a result of checking at step S43, if the LSP 304 does not use the tunneling LSP as a part of the transfer route in the LSR 107, the process is transit to step S47 directly to perform modification of parameter of the LSP 304 (step S47 in FIG. 7).

As a result of process at step S47, if the modification of parameter is not successful, the process is moved to the procedure for setting the LSP without performing merge (step S52 in FIG. 7). If the modification of parameter is successful, the LSP to be newly established is merged to the LSP 304 to transmit the LSP setup response 406 to the LSR 106 steps S50 and S51 in FIG. 7). As a result of the process at steps S50 and S51, setting of the LSP 305 from the LSR 106 as the starting point and merged to the LSP 304 at the LSR 107 is completed.

Next, discussion will be given for the operation when the LSP having the common route to the egress LSR does not exist in the LSR 107 upon receipt of the LSP setup request 405 at step S42. FIG. 5 shows the case where the LSR 106 initiates the setup request of the LSP to the LSR 111 via the LSR 107.

At first, check is performed whether or not the route to the terminal end of the tunneling LSP set at the LSR 107 may be taken as a part of the route to the egress LSR (step S44 in FIG. 7). Here, the starting point of the tunneling LSP is not necessarily LSR 107.

As a result of checking at step S44, if the route up to the terminal end of the tunneling LSP 303 as set in the LSR 107 cannot be a part of the route of the LSP to be newly established, attempt is made to make the newly established LSP to be accommodated in the tunneling LSP and the procedure to establish the LSP is executed (step S52 in FIG. 7).

As a result of checking at step S44, if the route up to the terminal end of the tunneling LSP 303 as set in the LSR 107 can be a part of the route of the LSP to be newly established, which corresponds the case illustrated in FIG. 5, for example, modification of parameter is performed so that the LSP to be newly established can be accommodated (step S46 in FIG. 7).

At step S46, exchange of the message relating to modification of parameter is similar to the same as the case where the modification of parameter is successfully at step S45.

As a result of the step S46, if the modification of parameter is not successful, attempt to accommodate the LSP to be newly established in the tunneling LSP 303 and process is transit to the procedure for establishing the LSP (step S52 in FIG. 7). If modification of parameter is successful, the newly established LSP is accommodated in the tunneling LSP 303 to transmit the LSP setup request to the LSR 109 as terminal end of the tunneling LSP 303 (steps S48 and S49 in FIG. 7).

Exchange of the message in the case that LSP setting is successful at step S49 and subsequent steps is performed in the sequential order of transmission of the LSP setup request 417 from the LSR 109 to the LSR 111, transmission of the LSP setup response 418 from the LSP 111 to the LSP 109, transmission of the LSP setup response 416 from the LSR 109 to the LSR 107, and transmission of the LSP setup response 406 from the LSR 107 to the LSR 106.

If the setting of the LSP fails at step S49 and subsequent steps, accommodation to the tunneling LSP 303 is released at step S48 to make setting of LSP error.

When the LSP setting is successful at step S49 and subsequent steps, setting of LSP 306 from the LSR 106 as being start point LSR 106 to the LSR 111 via the LSR 107 and the LSR 109 is completed. Among the transfer route of the LSP 306, in the section from the LSR 107 to the LSR 109, merge is performed on the LSP 304 and the tunneling LSP 303.

Next, discussion will given for the packet structure of the MPLS transferred on the LSP 306. Among the LSP 306, in the portion where the tunneling LSP 303 is used as the transfer route, the shim header storing the label assigned for the LSP 303 is added in front of the shim header storing the label assigned for the LSP 306, is transferred.

For example, between the LSR 107 and the LSR 108, the shim header storing the label assigned for the LSP setup response 408 is added in front of the shim header storing the label assigned to the LSP setup response 416.

In the shown embodiment, when the tunneling LSP can be used as a part of the route of the newly established LSP, modification of the parameter of the tunneling LSP is negotiated so that the newly established LSP can be accommodated in the tunneling LSP. If modification is possible, the tunneling LSP is used as a part of the LSP to be newly established.

In addition, it is already known that the tunneling LSP can accommodate the newly established LSP without negotiation, negotiation is not performed and the newly established LSP is accommodated in the tunneling LSP. Namely, step S46 of FIG. 7 is omitted.

On the other hand, in the shown embodiment, discussion has been made under the premise that the tunneling LSP is preliminarily set. However, when the tunneling LSP is not present, the newly established LSP may have a part of the route common to existing route. At this time, in the common portion, the tunneling LSP is newly set. Then, in the newly set tunneling portion, the newly established LSP may be merged to the existing LSP.

Namely, in this case, at step S46 of FIG. 7, instead of negotiating modification of parameter of the tunneling LSP, the tunneling LSP is set so as to accommodate both of the newly established LSP and the existing LSP.

On the other hand, while two level of label stack is used in the shown embodiment, this can be extended to arbitrary number of levels. Namely, the present invention is applicable for the case where the tunneling LSP is used as a part of the route of another tunneling LSP to stack arbitrary number of stacks.

Furthermore, the present invention may be implemented in other way with taking Asynchronous Transfer Mode (ATM) network as a replacement of the MPLS network, a Virtual Channel (VC) as a replacement of the LSP, and an ATM switch as a replacement of the LSR. In this case, in the portion tunneled by the tunneling VP, VP switching is performed.

In the shown embodiment, since merge is performed only in the transfer route portion of the tunneling LSP, it becomes not only possible to perform merge of the LSP having collateral parameter, but also can perform branching at the portion other than the transfer route portion of the tunneling LSP.

In FIG. 5 of the shown embodiment, LSP 304 and the LSP 306 are merged between the LSR 107 and the LSR 109 by the tunneling LSP 303, the LSR 110 and the LSR 111 are branched at the LSR 109.

Next, the first embodiment of the present invention illustrated in FIG. 1 will be discussed again in greater detail. In the shown embodiment, LSRs 101 to 104 are present in the MPLS network 1. Respective LSRs 101 to 104 are connected to the links 201 to 203. On the other hand, the LSP 301 taking the LSR 101 as starting point and the LSR 103 as terminal point is preliminarily established via the LSR 102. To the LSP 301, as a reserved bandwidth for transit link, 10 Mbit/sec. is set in each of the LSRs 101 to 104.

Here, it is assumed that LSP is newly set from the LSR 104 to the LSR 103 as the terminal point via the LSR 102. Here, it is assumed that a bandwidth to be reserved for the LSP to be newly established is 5 Mbit/sec.

The LSR 104 temporarily set the reversed bandwidth of 5 bit/sec. at own node and transmits the LSP setup request (label request message) 401 to the LSR 102. In the LSP setup request 401, information indicative that the transit nodes are the LSR 102 and the LSR 103 and traffic parameter indicating that the bandwidth to be reserved is 5 bit/sec are contained.

The LSR 102 upon receipt of the LSP setup request 401 performs retrieval of the LSP that may have the route to the egress LSR 103 in common with the newly established LSP, at the LSR 102. Here, the LSP 301 is found in the retrieval, which LSP 301 has the common route up to the egress LSR 103.

Next, check is performed whether the LSP 301 has the parameter of the reserved bandwidth. If the LSP 301 has the parameter of the reserved bandwidth, the parameter is modified to permit merge of the newly established LSP.

Here, check is performed whether the reserved bandwidth of 10 Mbits/sec. of the LSP 301 may be combined with the bandwidth of 5 Mbits/sec. to be reserved for the newly established LSP. If the reserved bandwidth can be combined to modify to 15 Mbits/sec. in total, the reserved bandwidth of the LSP 301 is temporarily set at the modified value at the LSR 102.

Next, the LSR 102 transmits the parameter modification request 403 to the LSR 103. In the parameter modification request 403, the value of 15 Mbit/sec. as the reserved bandwidth of the LSP 301 to be modified is contained.

The LSP 103 upon receipt of the parameter modification request makes judgment whether or not the reserved bandwidth of the LSP 301 can be modified to 15 Mbit/sec. If modification is possible, the reserved bandwidth of the LSP 301 is modified to 15 Mbit/sec. Then, parameter modification response 404 is returned to the LSR 102.

The LSR 102 upon receipt of the parameter modification response 404 fixes the temporarily set parameter and returns LSP setup response (label mapping message) 402 to the LSR 104. In the LSP setup response 402, a label value ton be used when the packet of the MPLS flowing on the LSP 302 after setting is transferred from the LSR 104 to the LSR 102. The label value is bound with the transfer label from the LSR 102 to the LSR 103 in the LSP 301.

The LSR 104 upon receipt of the LSP setup response 402 fixes the temporarily set bandwidth reservation, and merges the newly established LSP to the LSP 301 to terminate setting of the LSP. Namely, the LSP 302 from the LSR 105 as the starting point to be merged to the LSP 301 at the LSR 102 is set. The LSP 302 may have the reserved bandwidth 5 bit/sec. and has the reserved bandwidth 15 Mbit/sec. from the LSR 102 to the LSR 103.

Figure 8:
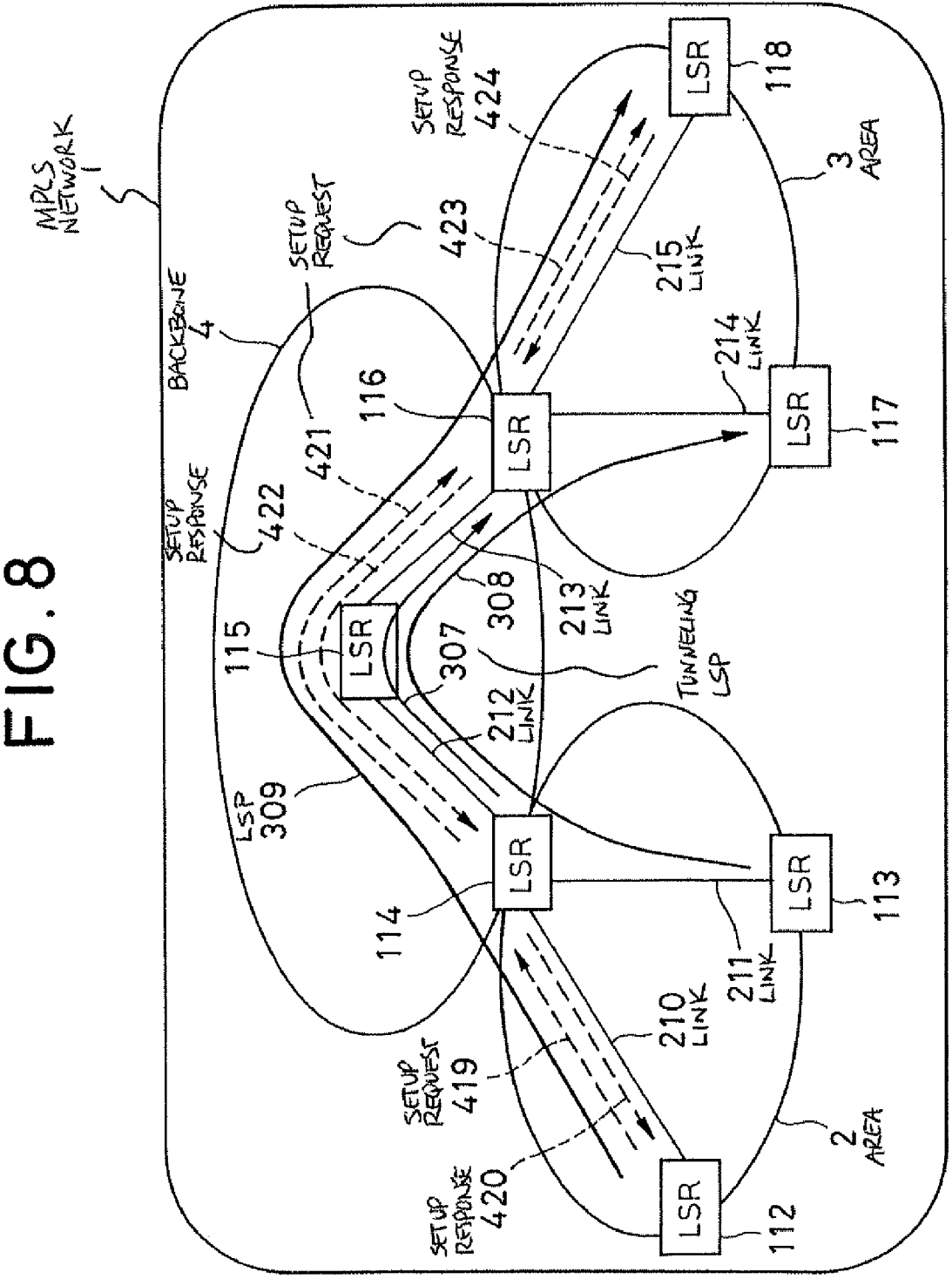
FIG. 8 is an illustration for explaining the second embodiment of a communication connection merge system according to the present invention.
Figure 9:
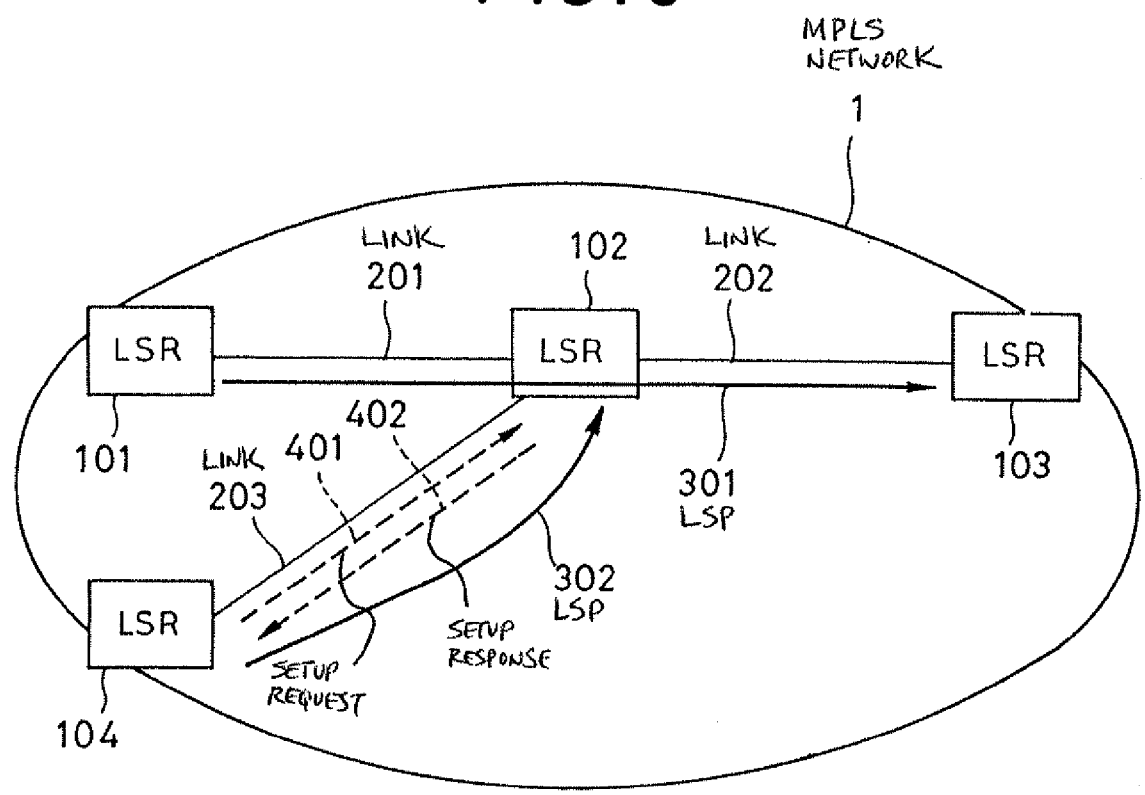
FIG. 9 is an illustration for explaining the conventional merge operation in the MPLS network.

FIG. 8 is an illustration for explaining the second embodiment of the present invention. Discussion will be given hereinafter for the second embodiment of the present invention with reference to FIG. 8.

The MPLS network 1 is consisted of the LSRs 112 to 118. Respective LSRs 112 to 118 are connected by the links 210 to 215. On the other hand, the MPLS network 1 is divided into regions of the areas 2, 3 and backbone 4 of the Open Shortest Path First (OSPF) routing protocol.

It is assumed that the LSP 308 from the LSR 113 as starting point to the LSR 117 as terminal point via the LSR 114 and the LSR 116 is preliminarily established. A section between the LSR 114 and the LSR 116 where the LSP 308 passes through the backbone 4, is tunneled by the tunneling LSP 307 from the LSR 114 as the starting point to reach the LSR 116 via the LSR 115.

In the portion where the transfer route of the LSP 308 is tunneled by the tunneling LSP 307, the label assigned for the tunneling LSP 307 is stacked in front of the label assigned for the LSP 308, in the packet transferred through the LSP 308.

On the other hand, it is assumed that the 30 Mbits/sec. as the reserved bandwidth of the transit link is transferred in the LSP 308 is set in each LSR. Even in the tunneling LSP 307, reservation of the bandwidth at 30 Mbit/sec. is made for accommodating the LSP 308.

Attempt is made to establish the LSP from the LSR 112 to the LSR 118. Then, the bandwidth of the newly established LSP is assumed to be 20 Sec/sec.

At first, LSR 112 derives the route to the LSR 118 using a topology information collected by the OSPF. In the OSPF, concerning the area that LSR 112 belongs to, connecting state of the links 210 to 215 may be seen. However, concerning the outside of the area that LSR 112 belongs to, it can be seen only accessibility. Therefore, as the result of calculation, LSR 112 should be only appreciated that the LSR 114 has to be passed to reach the LSR 118.

The LSR 112 transmits the LSP set up request (label request message) 419 to the LSR 114. In the LSP setup request 419, information indicating that the transit node is LSR 114 and the destination is LSR 118 and traffic parameter as 20 Mbits/sec. as the bandwidth to be reserved.

The LSR 114 upon receipt of the LSP setup request 419 performs routing to the LSR 118. As a result of routing, it can be appreciated that LSR 115 and the LSR 116 are to be passed in the backbone 4.

Here, check is performed whether or not the LSP that may have the route to the egress LSR 118 in common with the newly established LSP is present. Namely, check is performed whether or not the LSP reaching the step 118 via the LSR 115 and the LSR 116 is present or not. Here, such LSP is not present.

Therefore, check is again performed whether the route at the terminal point of the tunneling LSP set in the LSR 114 can be a part of the transit route of the LSP to be set. Here, check is performed whether or not the tunneling LSP having the terminal point at the LSR 116 via the LSR 115, is present. Accordingly, the tunneling LSP 307 is selected as candidate.

Next, check is performed whether or not the tunneling LSP 307 has the parameter of the reserved bandwidth. If the tunneling LSP 307 has the reserved bandwidth as parameter, the reserved bandwidth is modified to 50 Sec/sec. as sum of 30 Mbits/sec. and 20 Mbits/sec. in the similar procedure in the first embodiment of the present invention.

If modification of the reserved bandwidth of the tunneling LSP 307 is successful, setting of the LSP is performed through the sequence of process that the LSP setup request 421 is transmitted from the LSR 114 to the LSR 116, the LSP setup request 423 is transmitted from the LSR 116 to the LSR 118, the LSP setup response 424 is transmitted from the LSP 118 to the LSR 116, the LSP set up response 422 is transmitted from the LSR 116 to the LSR 114, and the LSP setup response 420 is transmitted from the LSR 114 to the LSR 112.

Upon transmitting the LSP setup request 423 from the LSR 116 to the LSR 118, the route to the LSR 118 is calculated by the OSPF to see that the next hop is the LSR 118. Finally, the LSP 309 is set with taking the LSR 112 as start point and the LSR 118 at terminal point via the LSR 114 and the LSR 116.

Among the transfer route of the LSP 309, between the LSR 114 and the LSR 116 as a portion to pass the backbone 4, the tunneling LSP 307 is used. In the backbone 4, for the packet transferred through the LSP 309, the label assigned for the tunnel LSP 307 is stacked in front of the label assigned to the LSP 309.

On the other hand, 20 Mbits/sec. is set as reserved bandwidth in the LSP 30. In the tunneling LSP 307, 50 Mbits/sec. as the reserved bandwidth as a sum of the 30 Mbits/sec. of the reserved bandwidth of the LSP 308 and 20 Mbits/sec. of the reserved bandwidth of the LSP 309 is set.

In the backbone 4, the LSP 308 and the LSP 309 entering into the area 2 is merged by the tunneling LSP 307, and is branched to the LSR 117 and the LSR 118 as exiting to the area 3.

As set forth above, upon performing merge of the LSP, merge operation is performed after modification of collateral parameter owned by the existing LSP for accommodating the newly established LSP. By this, it becomes possible to perform merge of the LSP having request bandwidth or the like which has not been merged conventionally. Thus, greater number of LSPs are merged to contribute for reduction of number of labels which is inherent in expansion of scale of the network.

On the other hand, by accommodating a plurality of LSPs with collateral parameters in the preliminarily set tunneling LSP, merge is possible only in the portion of the tunneling LSP. For example, even when most of the LSPs pass the same portion in the network, merge cannot be performed unless the route up to the egress LSR is common. In contrast to this, according to the present invention, by setting the tunneling LSP for the portion where a plurality of LSPs pass the common route, merge becomes possible in the portion where the tunneling LSP is present.

As set forth above, with the communication connection merge system according to the present invention, upon performing merge, collateral parameter, such as request bandwidth or the like may also be merged together with LSP upon merging after modification of the collateral parameter of the existing LSP so that the newly established LSP may be accommodated.

Also, in another communication connection merge system of the present invention, by accommodating a plurality of LSP switch collateral parameters in the preliminarily set tunneling LSP, merge in only portion of the tunneling LSP becomes possible. Therefore, it becomes possible not only to merge the LSPs together with the parameters, but also to branch the LSPs at the mid-way even once merged.

While the present invention has been discussed in terms of the preferred embodiment, various modifications, omissions, additions and different designs without departing from the principle of the invention should be obvious to those skilled in the art. Therefore, the present invention should be understood as including all possible embodiments, modifications, omissions, additions and so forth which can be implemented without departing from the principle of the invention set forth in the appended claims.

What is claimed is:

1. A communication merge method, performed by a processor in a connection-oriented network, which consolidates an existing communication connection having a first route to a first destination node with a second communication connection having a second route to a second destination node, where said first and second destination nodes are different, comprising:
   determining, by the processor, whether a tunneling communication connection is present from a third node to a fourth node, where said third and fourth nodes are in both said first route and said second route;
   determining, by the processor, whether modification of a parameter of said tunneling connection is possible, if said tunneling communication connection is present;
   modifying, by the processor, the parameter of said tunneling communication connection to accommodate a merger of said existing and second communication connections, if modification is possible; and
   merging, by the processor, said communication connections on said tunneling communication connection.

2. The communication merge method of claim 1, where said existing communication connection is a tunneling communication connection.

3. The communication merge method of claim 1, where said method further comprises:
   creating a new tunneling communication connection from a fifth node to a sixth node, where said fifth and sixth nodes are in said first route and second route, if said tunneling communication connection is not present.

4. The communication merge method of claim 1, where said connection-oriented network includes a multi-protocol label switching network, said existing and second communication connections include a label switched path, and said first, second, third, and fourth nodes include a label switching router.

5. The communication merge method of claim 1, where said connection-oriented network includes an asynchronous transfer mode network, said existing and second communication connections include a virtual channel, said tunneling communication connection includes a virtual path, and said first, second, third, and fourth nodes include an asynchronous transfer mode switch.

6. The communication merge method of claim 1, comprising:
   stacking a label assigned for the tunneling communication connection in a shim header.

7. The communication merge method of claim 1, where said parameter includes a bandwidth parameter.

8. The communication merge method of claim 1, further comprising:
   determining, at least one other node, if modification of the parameter is possible; and
   temporarily setting, by the at least one other node, the modification of the parameter when modification of the parameter at the at least one other node is possible.

9. A node that consolidates communication connections having different destination nodes in a connection-oriented network, comprising:
   a processor that:
      determines whether a tunneling communication connection is present in a first route of an existing communication connection and in a second route of a second communication connection,
      determines whether modification of a parameter of said tunneling communication connection is possible,
      modifies the parameter of said tunneling communication connection to accommodate merging said second communication connection in said tunneling communication connection, if modification is possible, and
      merges said existing communication connection and said second communication connection on said tunneling communication connection.

10. The node as set forth in claim 9, where said existing communication connection includes a tunneling communication connection.

11. The node at set forth in claim 9, where said processor creates a tunneling communication connection capable of accommodating said existing communication connection, where said tunneling communication connection is in said first route and said second route.

12. The node as set forth in claim 9, where said connection-oriented network includes a multi-protocol label switching network, said existing and second communication connections include a label switched path, and said node includes a label switching router.

13. The node as set forth in claim 9, where said connection-oriented network includes an asynchronous transfer mode network, said existing and second communication connections include a virtual channel, said tunneling communication connection includes a virtual path, and said node includes an asynchronous transfer mode switch.

14. The node as set forth in claim 9, where said parameter includes a bandwidth parameter.

15. The node as set forth in claim 9, further comprising at least one other node, where the at least one other node:
   determines if modification of the parameter is possible, and
   temporarily sets the modification of the parameter when modification of the parameter at the at least one other node is possible.

16. A method comprising:
   determining whether a tunneling communication connection is present in an existing communication connection including a first route to a first destination node and a second communication connection to be newly set including a second route to a second destination node, where said first node and said second node are different nodes, and wherein a plurality of nodes are associated with the tunneling communication connection;

sending a parameter modification request from one of the nodes to at least one other node;

receiving, from the at least one other node, a parameter modification response that indicates whether modification of a parameter is possible at the at least one other node;

fixedly modifying the parameter of the tunneling communication connection when modification of the parameter is possible at the at least one other node; and merging said communication connections on said tunneling communication connection based on the fixedly modified parameter.

17. The method of claim 16, where the parameter includes a bandwidth parameter.

18. The method of claim 16, where said existing and second communication connections include a label switched path, and said first and second nodes include a label switching router.

19. The method of claim 16, where said existing and second communication connections include a virtual channel, said tunneling communication connection includes a virtual path, and said first and second nodes include an asynchronous transfer mode switch.

20. The method of claim 16, comprising:

creating a new tunneling communication connection from a third node to a fourth node, wherein said third and fourth nodes are in said first route and second route, if said tunneling communication connection is not present.

* * * * *